T. W. BARNHILL & T. B. PAYNE.
Fender for Trees.

No. 223,093.  Patented Dec. 30, 1879.

WITNESSES
Villette Anderson.
F. J. Masi.

INVENTORS
Thomas W. Barnhill
Thomas B. Payne
by E. W. Anderson
their ATTORNEY

UNITED STATES PATENT OFFICE.

THOMAS W. BARNHILL AND THOMAS B. PAYNE, OF PROVIDENCE, KY.

IMPROVEMENT IN FENDERS FOR TREES.

Specification forming part of Letters Patent No. 223,093, dated December 30, 1879; application filed April 12, 1879.

*To all whom it may concern:*

Be it known that we, THOMAS W. BARNHILL and THOMAS B. PAYNE, of Providence, in the county of Webster and State of Kentucky, have invented a new and valuable Improvement in Tree-Boxes; and we do hereby declare that the following is a full, clear, and exact description of the construction and operation of the same, reference being had to the annexed drawings, making a part of this specification, and to the letters and figures of reference marked thereon.

Figure 1:
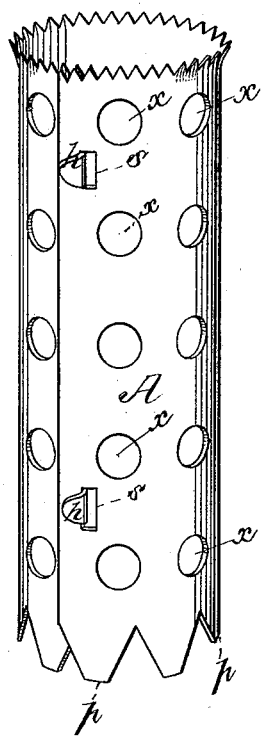
Figure 2:
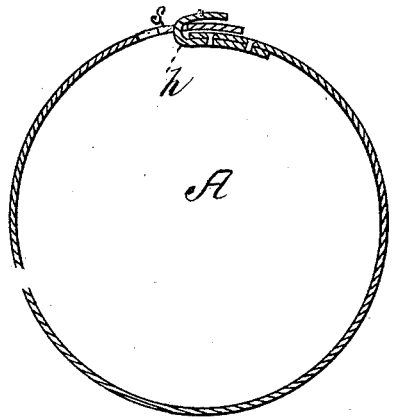

Figure 1 of the drawings is a representation of a perspective view of our improved tree-guard, and Fig. 2 is a transverse section thereof.

This invention has relation to improvements in tree boxes or guards, the object of which is to protect young trees on sidewalks or in plantations from the injurious attacks of sheep, goats, and other rodent animals.

The nature of the invention consists in the construction and novel arrangement of parts, as hereinafter shown and described.

In the annexed drawings, the letter A designates the guard or box, usually made of sheet metal, and of a length and diameter proportionate to the size of the tree. The body of the guard is provided with a number of spaced perforations, $x$, which allow free ventilation of the tree and access thereto of sunlight and moisture. The guard is provided upon one edge with a number of slots, $s$, and on the other with a number of correspondingly-located hooks, $h$, the object of which will be hereinafter explained.

The upper edge of the tree-box is flaring and serrated, to prevent persons from climbing up and injuring the tree, and also to give it a finished appearance, and the bottom edge provided with V-shaped drive-points $p$, that allow the guard to be forced into the ground.

The guard is placed in position around the tree, and being made to inclose the same, the hooks $h$ are engaged with the slots $s$ aforesaid, and the said guard being released from compressure, the natural spring of the metal causes the hooks to be locked into the slots.

We are aware that a paper celery-collar, one edge having a hook and the other a series of spaced holes, in which, as the plant expands, the hook is torn from one hole to another; also that a tree-protector surrounding a part of the upper portion of the trunk of a tree, and having upon its upper edge slits to allow the metal between them to be bent inward to the trunk, serving as a trap to prevent insects from crawling up to the branches; and, also, that a tree-protector composed of a metallic body provided with perforations and supporting-legs, and having at its upper edge an oil top covering, designed to be tied around the tree above the said body, thus also serving as a trap; and, finally, that a tree-protector provided with downwardly-projecting tongues or spurs, formed by being cut from sheet-metal slats, are none of them new; hence we do not claim such devices.

What we claim as new, and desire to secure by Letters Patent, is—

A tree-box having the flaring serrated upper edge and V-shaped drive-points $p$ at its lower edge, and extending around its sides the ventilating-perforations $x$, and the slots $s$ on one edge thereof, all formed out of the body portion of said box, and provided on the opposite edge with fastening-hooks $h$, by means of which it is held into engagement with the slots by the resilience of said box, as shown and described.

In testimony that we claim the above we have hereunto subscribed our names in the presence of two witnesses.

THOMAS W. BARNHILL.
THOMAS B. PAYNE.

Witnesses:
H. C. JOHNSON,
S. HICKS.